June 19, 1928.  
L. J. F. FILLOUX  
1,673,817

GUN CARRIAGE WITH SPLIT TRAILS

Filed Dec. 7, 1926

Inventor,
Louis Jean Francois Filloux,
By Mauro, Cameron, Lewis & Kerkam,
attorneys Patented June 19, 1928.

1,673,817

UNITED STATES PATENT OFFICE.

LOUIS JEAN FRANÇOIS FILLOUX, OF LE HAVRE, FRANCE.

GUN CARRIAGE WITH SPLIT TRAILS.

Application filed December 7, 1926, Serial No. 153,151, and in France December 11, 1925.

This invention relates to guns of the split trail type of the kind described in the U. S. Patent No. 1,483,169.

Such patent describes an improvement in gun carriages with a split trail consisting among other things, in mounting the transport devices upon these trail members themselves. In this way it is possible to make the transport devices of large dimensions and construct them in the form of endless tracks without there being any risk of impeding the expanding movement of the trail members as in other systems.

In describing constructional forms, devices were indicated in the specification of the said prior patent, which permitted the said transport devices and, more particularly, endless tracks employed on bad ground, to be fitted to the trail members and removed therefrom.

The present invention has for its subject matter a device of this kind, characterized by the feature that each transport device (endless track or wheel) is fitted, to the corresponding trail member, by means of a stub axle fitting mounted directly on the trail member, or mounted upon a crank which pivots around the axis of a shaft journalled in the said trail member and subjected to the action of a suspension spring.

The accompanying drawings illustrate, by way of example, two forms of the device according to the invention.

Figure 1:
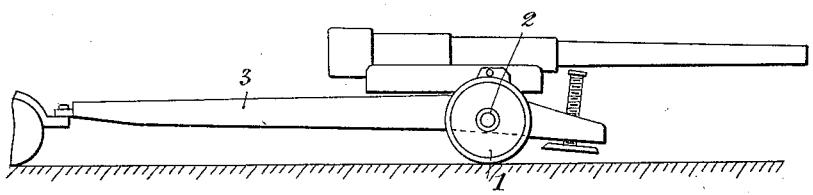
Fig. 1 shows the invention as fitted to a wheel gun carriage, in side elevation.

In Fig. 1, each wheel 1 is mounted upon a central stub axle 2, fitted to the corresponding trail member 3.

Figure 2:
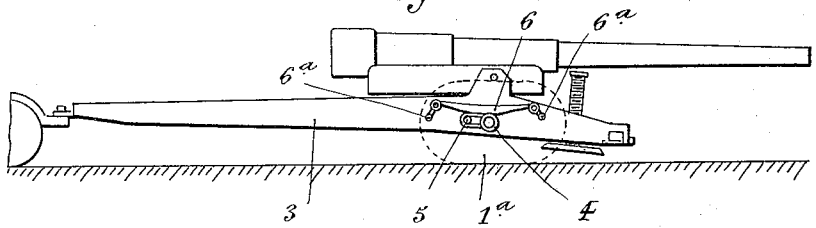
Fig. 2 is a similar view of a gun carriage, mounted on endless tracks.
Figure 3:
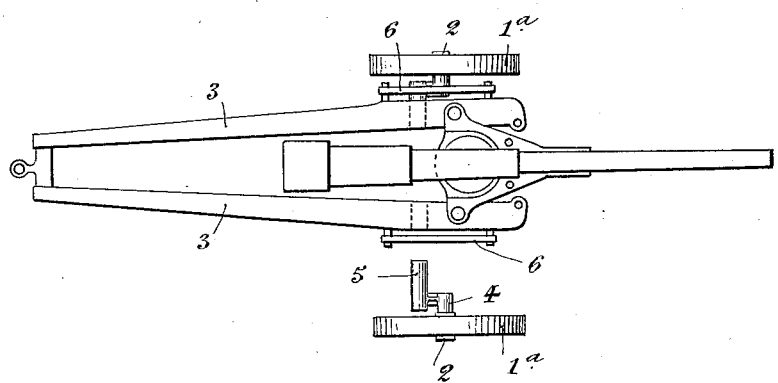
Fig. 3 is a plan view of Fig. 2.

In the modification shown in Figs. 2 and 3, the transport device, which is an endless track 1ª, is also mounted upon a stub axle 2, but this forms the pin of a crank 4, the shaft 5 of which is journalled in the corresponding trail member. The crank 4 bears towards its end beneath a leaf spring 6, attached to the said trail member, by means of shackles 6ª.

The transport device can be dismounted in both cases by withdrawing it from the stub axle 2.

In the second case this transport device can, moreover, be left upon the stub axle and dismounted from the trail member by withdrawing the shaft piece 5 from its lodgement in the trail member, the space taken up in width by the gun being thus made smaller.

It is understood that the crank device may be employed indifferently with wheels or endless tracks and, further, that this device may be constructed in any suitable form.

Claims.—

1. In a gun carriage fitted with a split trail comprising two trail members, the combination, with said trail members, of transport devices, and a stub axle fitting arranged between and connecting together each trail member and the corresponding transport device, such stub axle being adapted to move relatively to the trail member.

2. In a gun carriage fitted with a split trail comprising two trail members, the combination, with said trail members, of transport devices, and a stub axle fitting arranged between and connecting together each trail member and the corresponding transport device, such stub axle being adapted to move relatively to the trail member under resilient control.

3. In a gun carriage fitted with a split trail comprising two trail members, the combination, with said trail members, of transport devices, and a stub axle fitting arranged between and connecting together each trail member and the corresponding transport device, and a crank arm arranged between the stub axle and its bearing in the trail member.

4. In a gun carriage fitted with a split trail comprising two trail members, the combination, with said trail members, of transport devices, and a stub axle fitting arranged between and connecting together each trail member and the corresponding transport device, and a crank arm arranged between the stub axle and its bearing in the trail member and a resilient spring engaging such stub axle to permit it to swing under resilient control.

In testimony whereof I have signed this specification.

LOUIS JEAN FRANÇOIS FILLOUX.